United States Patent
Agarwal et al.

(10) Patent No.: US 10,417,114 B2
(45) Date of Patent: Sep. 17, 2019

(54) TESTING TOOL FOR TESTING APPLICATIONS WHILE EXECUTING WITHOUT HUMAN INTERACTION

(71) Applicant: Apple Inc., Cupertino, CA (US)

(72) Inventors: Ashish Agarwal, Sunnyvale, CA (US); Trystan Peter Kosmynka, San Jose, CA (US); Alexander Ashley Miyamura, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 43 days.

(21) Appl. No.: 15/652,408

(22) Filed: Jul. 18, 2017

(65) Prior Publication Data
US 2019/0026215 A1    Jan. 24, 2019

(51) Int. Cl.
*G06F 11/36* (2006.01)
*G06F 3/0481* (2013.01)
*G06F 3/0484* (2013.01)

(52) U.S. Cl.
CPC ...... *G06F 11/3664* (2013.01); *G06F 11/3688* (2013.01); *G06F 3/0481* (2013.01); *G06F 3/04842* (2013.01)

(58) Field of Classification Search
CPC ............. G06F 11/3636; G06F 11/3664; G06F 11/3688; G06F 11/3692; G06F 8/20; G06F 8/38; G06T 7/337; G06T 7/60; G06T 7/97; G06T 11/60

USPC ......................................................... 717/125
See application file for complete search history.

(56) References Cited

U.S. PATENT DOCUMENTS

| | | | |
|---|---|---|---|
| 8,365,147 B2 | 1/2013 | Grechanik et al. | |
| 9,053,242 B2 | 6/2015 | Smith et al. | |
| 9,274,935 B1 | 3/2016 | Lachwani et al. | |
| 9,454,464 B2 | 9/2016 | Fernandez et al. | |
| 2006/0085132 A1* | 4/2006 | Sharma et al. | G06F 11/3688 702/1 |
| 2013/0132933 A1* | 5/2013 | Rajaram et al. | G06F 11/3636 717/126 |
| 2015/0082283 A1* | 3/2015 | Smith et al. | G06F 11/3688 717/125 |
| 2016/0124924 A1* | 5/2016 | Greenburg et al. | G06T 11/60 715/738 |

* cited by examiner

*Primary Examiner* — Wei Y Zhen
*Assistant Examiner* — Mohammed N Huda
(74) *Attorney, Agent, or Firm* — Polsinelli PC

(57) ABSTRACT

The present technology consists of an automatic application testing tool that can initiate execution of an application submitted for testing by an application developer. The application testing tool can analyze views of the application while the application is executing to determine navigation objects and possible interactions with the navigation objects. The application testing tool can automatically apply possible interactions to the navigation objects and can record application execution data during the testing.

22 Claims, 14 Drawing Sheets

```
402  Window:    {
         interactable:
         false,
         probabilities:
     }
     ]

NavigationBar:      {
404      interactable: true,
         probabilities: [
             { interaction:Interaction,TAP,
             transition:Transition.FORWARD, probability:
             0.25 },
             { interaction:Interaction,TAP,
             transition:Transition.BACKWARD, probability:
             0.25 },
             { interaction:Interaction,TAP,
             transition:Transition.MODIFYING_CONTENT,
             probability:0.25 }

ActionSheet:    {
410      interactable: true,
         probabilities: [
             { interaction:Interaction,TAP,
             transition:Transition.FORWARD, probability:
             0.25 },
             { interaction:Interaction,TAP,
             transition:Transition.BACKWARD, probability:
             0.25 },
             { interaction:Interaction,TAP,
             transition:Transition.MODIFYING_CONTENT,
             probability:0.25 }

Link:    {
420      interactable: true,
         probabilities: [
             { interaction:Interaction,TAP,
             transition:Transition.FORWARD, probability:
             0.75 },
             { interaction:Interaction,TAP,
             transition:Transition.BACKWARD, probability:
             0.25 },
             { interaction:Interaction,TAP,
             transition:Transition.MODIFYING_CONTENT,
             probability:0.50 }
     }
```

Figure 6

```
TableView:    {
    interactable: true,
    probabilities:   [
        { interaction:Interaction,TAP,
        transition:Transition.FORWARD, probability:
        0.25 },
        { interaction:Interaction,TAP,
        transition:Transition.BACKWARD, probability:
        0.10 }, { interaction:Interaction,SWIPE_LEFT,
        transition:Transition.FORWARD, probability:
        0.50 },
        { interaction:Interaction,SWIPE_UP,
        transition:Transition.FORWARD, probability:
        0.75 },
        { interaction:Interaction,SWIPE_RIGHT,
        transition:Transition.BACKWARD, probability:
        0.50 },
        { interaction:Interaction,SWIPE_LEFT,
        transition:Transition.BACKWARD, probability:0.75 }
}
```
408

```
SearchBar:    {
    interactable: false,
    probabilities: [
        { interaction:Interaction,TAP,
        transition:Transition.FORWARD, probability:
        0.10 },
        { interaction:Interaction,TAP,
        transition:Transition.BACKWARD, probability:
        0.10 },
        { interaction:Interaction,TAP,
        transition:Transition.MODIFYING_CONTENT,
        probability:0.75 }
}
```
412

```
StaticText:    {
    interactable:
    false,
    probabilities:
    }
```
414

Figure 6 con't

```
Menu:       {
    interactable: true,
    probabilities: [
        { interaction:Interaction,TAP,
        transition:Transition.FORWARD, probability:
        0.25 },
        { interaction:Interaction,TAP,
        transition:Transition.BACKWARD, probability:
        0.25 },
        { interaction:Interaction,TAP,
        transition:Transition.MODIFYING_CONTENT,
        probability:0.25 }

ScrollView:    {
    interactable: true,
    probabilities: [
        { interaction:Interaction,TAP,
        transition:Transition.FORWARD, probability:0.10 },
        { interaction:Interaction,TAP,
        transition:Transition.BACKWARD, probability:0.10 },
        { interaction:Interaction,TAP,
        transition:Transition.MODIFYING_CONTENT, probability:
        0.25 }, { interaction:Interaction,SWIPE_LEFT,
        transition:Transition.FORWARD, probability:0.50 },
        { interaction:Interaction,SWIPE_UP,
        transition:Transition.FORWARD, probability:0.75 },
        { interaction:Interaction,SWIPE_RIGHT,
        transition:Transition.BACKWARD, probability:0.50 },
        { interaction:Interaction,SWIPE_DOWN,
        transition:Transition.BACKWARD, probability:0.75 }
```

416 points to Menu block; 406 points to ScrollView block.

Figure 6 con't

| All Paths Use SSL | HTTP Errors | Domain | Paths | Company | Location | Size | Number of R |
|---|---|---|---|---|---|---|---|
| ⊙ | | settings.crashlytics.com | 1 | Amazon.com_inc. | ASHBURN, VA, US | 1.20 KB | 1 |
| ⊙ | | www.amazon.com | 9 | Amazon.com_inc. | SANJOSE,CA, US | 26.40 KB | 11 |
| ⊙ | | msh.amazon.com | 7 | Amazon_Technologies_inc. | ASHBURN, VA, US | 17.06 KB | 23 |
| ⊙ | | mads.amazon-adsystem.com | 1 | Amazon_Technologies_inc. | ASHBURN, VA, US | .064 KB | 1 |
| ⊙ | | device-metrics-us-2.amazon.com:443 | 1 | Unknown | Unknown, Unknown, Unknown | 0.83 KB | 3 |
| ⊙ | | ffs.na.amazon.com | 7 | Amazon.com_inc. | ASHBURN, VA, US | 4.33 KB | 14 |
| ⊙ | | dwvjayoxjbnyrr.cloudfront.net | 1 | Amazon.com_inc. | SANJOSE,CA, US | 2.20 KB | 1 |
| ⊙ | | images-na.ssl-images-amazon.com | 31 | Amazon.com_inc. | SANJOSE,CA, US | 430.47 KB | 31 |
| ⊙ | | s.amazon-adsystem.com | 1 | Amazon.com_inc. | ASHBURN, VA, US | 0.32 KB | 1 |
| ⊙ | | unagi.amazon.com | 1 | Amazon_Technologies_inc. | ASHBURN, VA, US | 0.55 KB | 2 |
| ⊙ | | images-na.ssl-images-?...azon.com | 1 | Unknown | Unknown, Unknown, Unknown | 7.37 KB | 1 |

702

Unique Screen Captures (3)

704

Figure 9

TESTING TOOL FOR TESTING APPLICATIONS WHILE EXECUTING WITHOUT HUMAN INTERACTION

TECHNICAL FIELD

The present technology generally pertains to a tool for testing a software application, and more specifically pertains to an automatic application testing tool that can automatically apply interactions to navigation objects in the user interface of the application.

BACKGROUND

Application testing is an important part of the software development process. However, even if it may be assumed that all or most application developers test their software applications prior to submitting them to a software and/or application distributor such as an App store, well run App stores still need to test applications for compliance with App store policies. App stores may have various tools for performing such testing, such as tools that review the static code of submitted applications, but such tools can be vulnerable when an application developer purposely obscures components or functions of the software application that do not comply with App store policies. As such, App stores still rely on human testing of executing applications to identify undesirable behaviors that may be uncovered when the application is running.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 6 shows an example of data from an interaction model in accordance with some embodiments;

FIG. 9 shows of an example user interface presenting data recorded by an application testing tool in accordance with some embodiments.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for an application testing tool that can automatically operate an application without human interaction, and can make decisions in real-time as to which interactions to make upon the application, and that can record and analyze performance of the application and calls made by the application to determine if the application complies with App store policies. A goal of the testing tool is to navigate through as many unique types of views of the application as possible, without continuing to test similar types of views that merely display different content. For example, an eCommerce application may have many different product pages, all of which have very similar content (only differing between the product they pertain to). These views may have things such as a way to add a product to a cart, view additional images and descriptions, view technical details, view reviews, et al. The application testing tool is configured to make decisions to avoid repeatedly testing similar product pages. Instead, by keeping track of every view visited and determining the similarity of a newly-visited view to a previously-visited view, we can determine the likelihood that exercising elements in the newly-visited view will result in the same view classes being visited as were visited before. In these instances, if the tool determines that it has tested a similar view, it will not exercise elements in that view. Instead, it will perform backwards navigations to attempt to locate a new, yet unseen and unexercised view types. This is done because similar views likely have similar function and logic, and given a limited runtime for each test, the application testing tool aims to exercise as many unique views/view types as possible.

Figure 1:
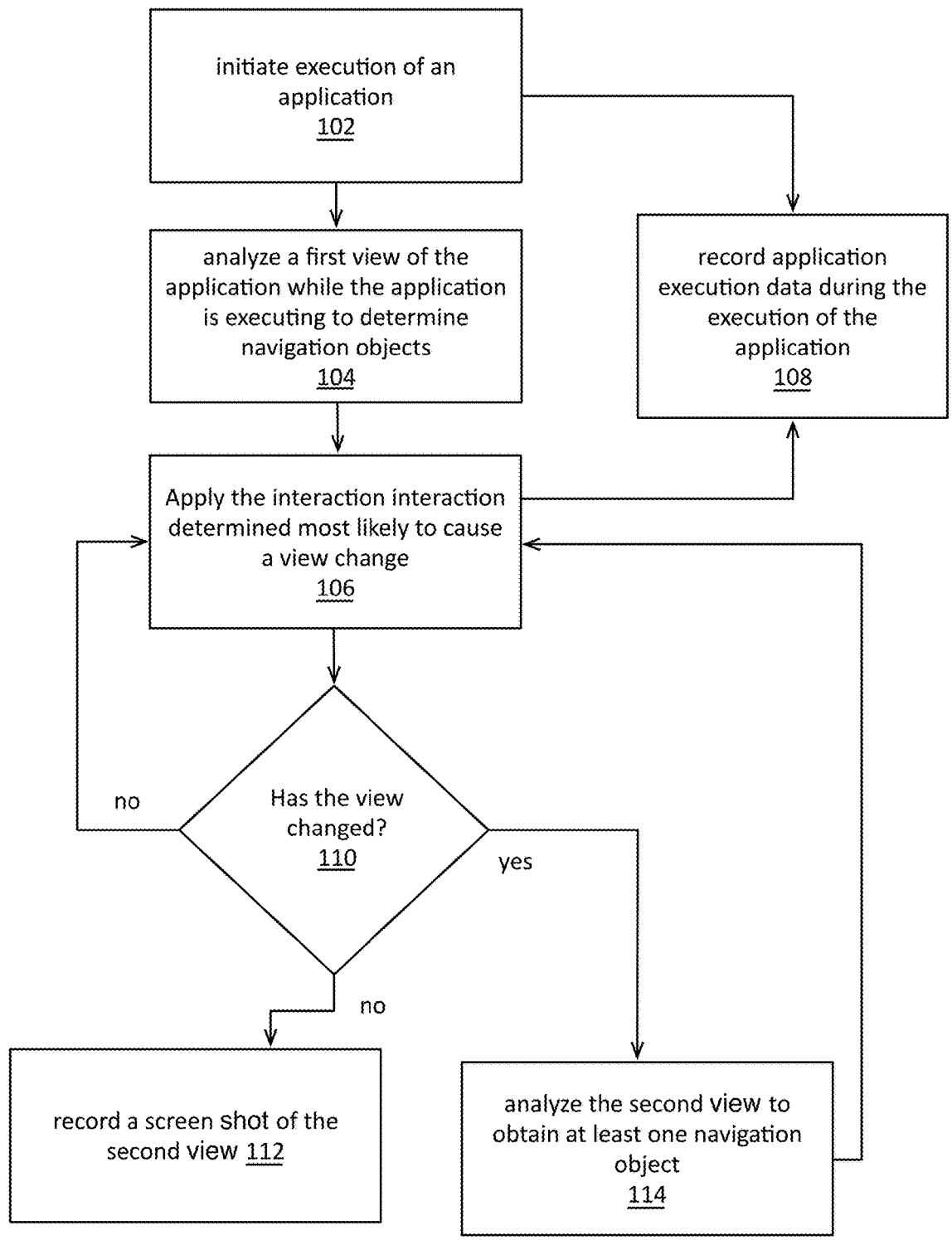
FIG. 1 shows an example method in accordance with some embodiments.

For example, and with reference to FIG. 1, the present technology consists of an automatic application testing tool that can initiate (102) execution of an application submitted for testing by an application developer. The application testing tool can analyze (104) a first view of the application while the application is executing to determine navigation objects and possible interactions with the navigation objects. Navigation objects are user interface objects that when they receive an interaction, such as an input, result in a change to the first view. For example, a change to the first view can include a forward navigation within the application (including scrolling within the view), a backwards navigation within the application (including scrolling within the view), or a modification of the content such as adjusting a zoom of the object, or a change in appearance, or some other modification, etc.

An interaction corresponds to an input received by the application being tested. An interaction with a user interface object may comprise a finger or stylus tap on a touchscreen displaying the interface object, a voice input to voice recognition input SW programmed to activate the interface object displayed on a display screen by a spoken input, a mouse click input to a mouse input interface for activating the interface object displayed on a display screen, etc. Such inputs can activate an interface object so as to cause an application into which they are integrated to programmatically perform a function.

The application testing tool can apply (106) one of the possible interactions to one of the navigation objects and can record (108) application execution data prior to, during, and after the application (106) of the interaction to the navigation object.

One aim of the application testing tool of the present technology is to efficiently navigate through as many unique types of views within the application as possible. As such, the application testing tool selects interactions with navigation objects that are the most likely to result in a forward navigation within the application and the application testing tool monitors its progress in navigating to new views to avoid looping back to types of views of the application already analyzed.

One way the application testing tool determines if an applied (106) interaction has resulted in a forward navigation of the application is to compare the first view with a current view of the application, the current view being a view after the interaction has been applied (106), to determine (110) if the view has changed. In some embodiments, it can be determined (110) that the view has changed when a threshold number of pixels is different between the first view and the current view, e.g., 50%, or 60% of the pixels are different, etc. In some embodiments, it can be determined (110) that the view has changed when the classes defining the user interface objects have changed.

When it has been determined (110) that the view has changed, the application testing tool can record (112) a screenshot of the current view, and/or analyze (114) the current view to obtain navigation objects and possible interactions with those navigation objects for the current view. The application testing tool can then apply (106) an interaction that is most likely to yield another forward navigation, and the tool can continue testing the application—all the while the tool can be recording (108) application execution data.

However if it was determined (110) that the applied (106) interaction did not result in the current view being different than the first view, it can be concluded that a forward navigation did not take place and a different interaction can be applied to the first view to attempt to achieve a forward navigation of the application.

In this way the application testing tool, can efficiently navigate forward within an application to be tested while the application is running, and can record application execution data to determine both stability of the application and compliance with App store policies.

Figure 2:
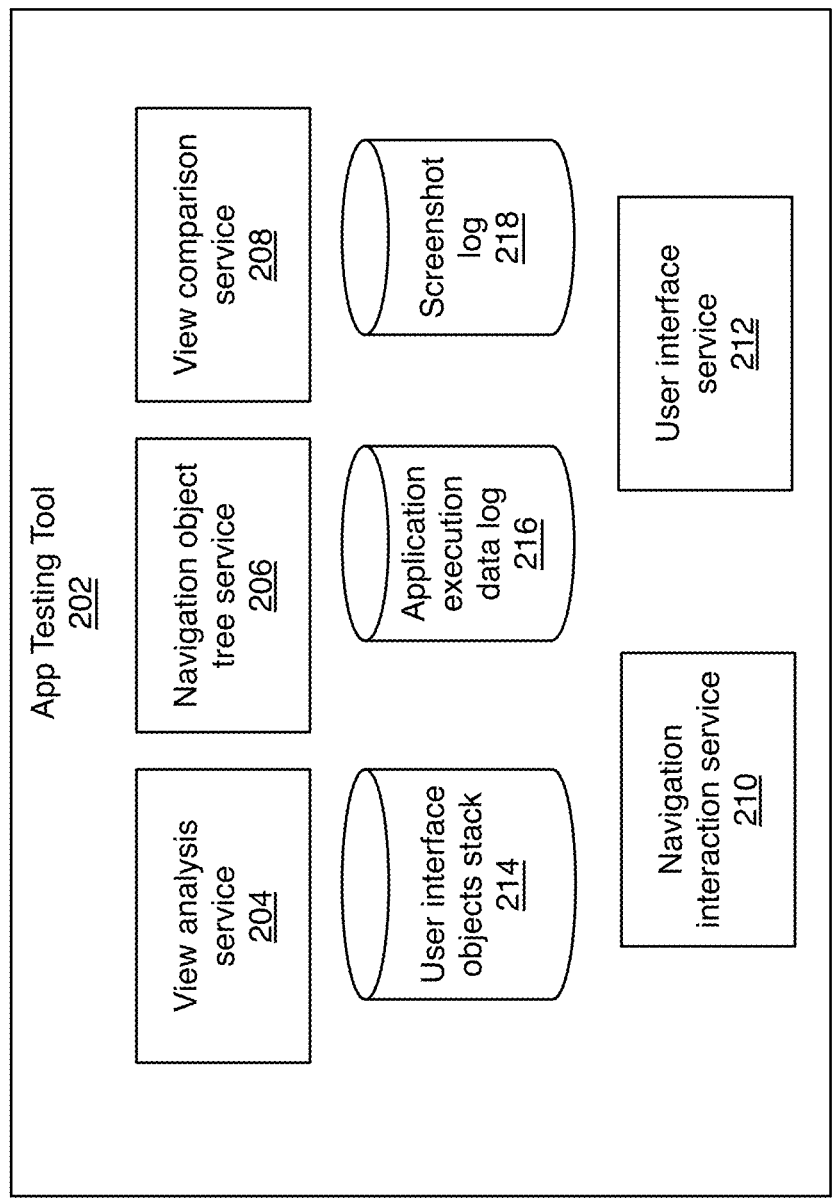
FIG. 2 shows an example system in accordance with some embodiments.
Figure 3:
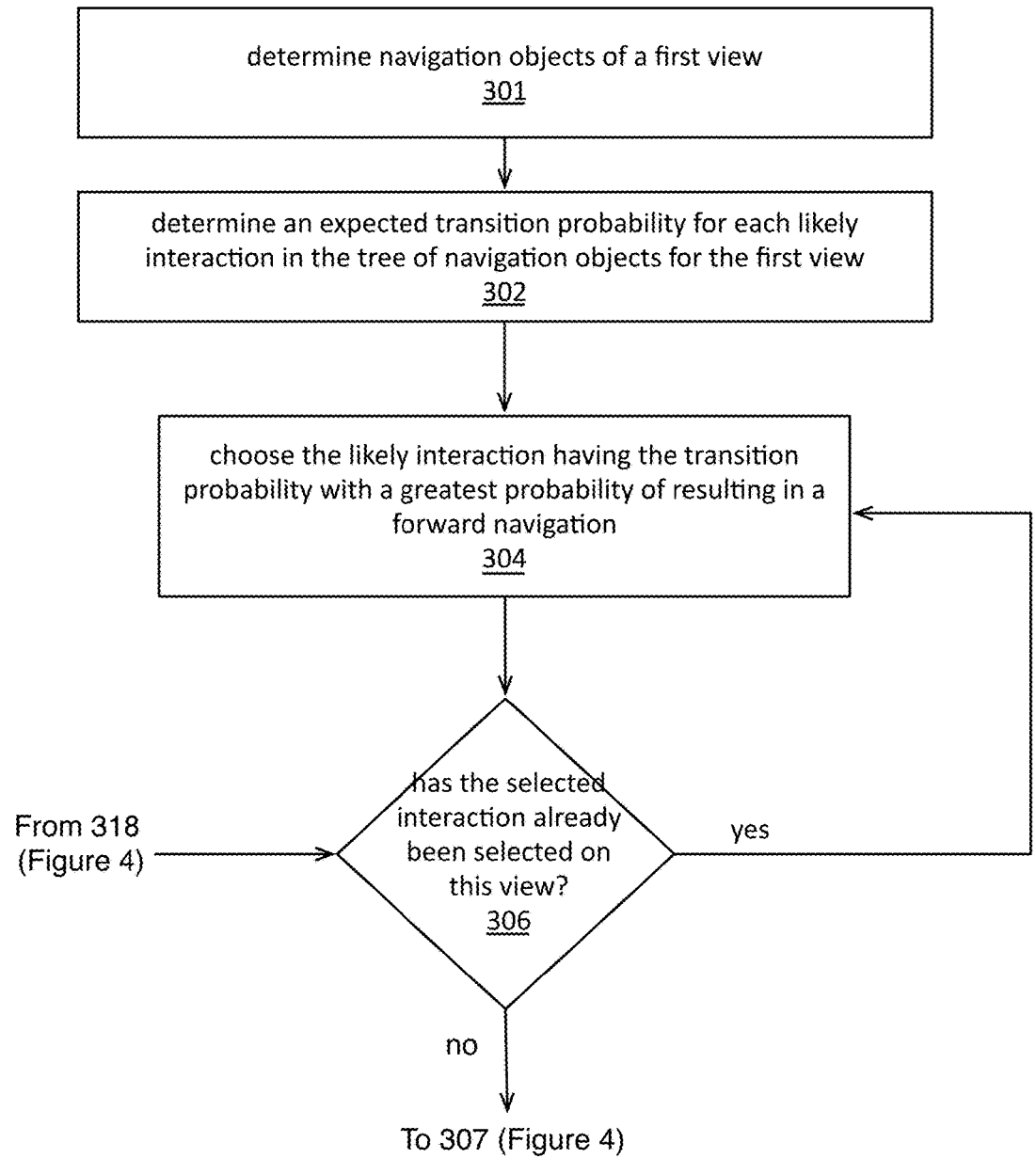
FIG. 3 shows an example method in accordance with some embodiments.
Figure 4:
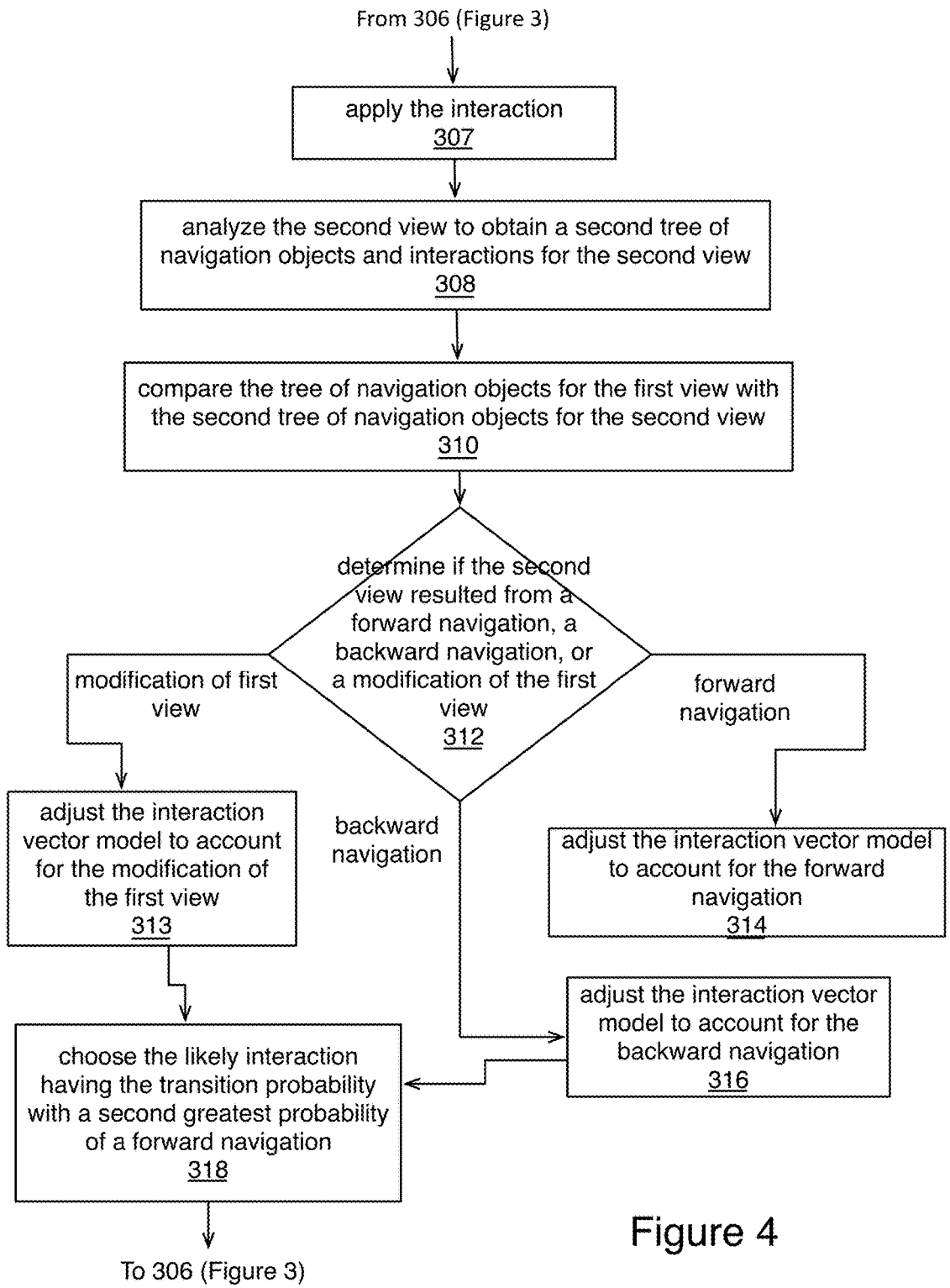
FIG. 4 shows an example method in accordance with some embodiments.

FIG. 2 illustrates an example system diagram of application testing tool 202, while FIG. 3 and FIG. 4 collectively illustrate an example method performed by application testing tool 202.

Application testing tool 202 can initiate execution of an application. In some embodiments, the application may require a login. In such embodiments, application testing tool 202 can detect a login screen, and can automatically input login credentials to the login screen. The login credentials can be provided by an application developer when they submit the application to be tested.

Figure 5:
FIG. 5 shows an example of a view layout of an application in accordance with some embodiments.

Once logged in, if required, view analysis service 204 of application testing tool 202 can analyze a first view of the application to determine (301) navigation objects displayed in the first view. In some embodiments, view analysis service 204 can determine navigation objects displayed in the first view by obtaining user interface classes used in the first view from an operating system supporting the application. The user interface classes are used to define the user interface objects in the first view. For example, as illustrated in FIG. 5, a view of an application can be made up of many user interface objects such as window 402, navigation bar 404, scroll view 406, table view 408, action sheet 410, search bar 412, static text 414, menu 416, ad view 418, and link 420.

As is typical with classes, the user interface classes can have various attributes, and one such attribute is whether objects spawned from the classes are interactable, i.e. they have an interactable attribute. FIG. 6 illustrates attributes of the classes that make up the objects labeled in FIG. 5. As shown in FIG. 6, window classes 402 and static text classes 414 do not have an interactable attribute, and thus objects spawned from these classes do not have a function in the navigation of the application. In contrast classes for navigation bar 404, action sheet 410, table view 408, link 420, search bar 412, menu 416, and scroll view 406 are all navigation classes because they have an interactable attribute. The objects created from these navigation classes are navigation objects because they have a function in the navigation of the application. While FIG. 6 illustrates user interface classes in a code format, such information can be received and analyzed in any format, e.g. a table, markup language, etc.

In addition to determining which user interface objects are navigation objects, in some embodiments, view analysis service 204 can further ignore some user interface objects that have an interactable attribute when interacting with the object would be destructive to the purpose of testing application. For example view analysis service 204, can disregard objects having a text label or accessibility label that indicate that the object should not be interacted with. For example an object being labeled "logout" should not be interacted with as interacting with a logout object would likely be destructive to the goal of testing the application. Likewise, advertisement objects such as ad view 418 are not considered as navigation objects because the goal of application testing tool 202 is not to test an advertisement but to test the application.

In addition to learning which user interface objects are in a view of the application, in some embodiments, view analysis service 204 can learn of arrangements (e.g. for example arrangements of layered user interface objects, i.e. arrangements of user interface objects in Z-space), and of dependencies of user interface objects (e.g. for example a menu object may be a parent of a menu item, etc.). The arrangement of layers and dependencies of user interface objects can be represented in a tree of descriptions of user interface objects.

It will be appreciated by those of ordinary skill in the art, that the method of querying the operating system to determine user interface classes is just one method to determine navigation objects and other methods are possible. For example, in some embodiments, view analysis service 204 can use machine vision techniques to identify navigation objects, or view analysis service 204 can analyze static code of application to determine navigation objects likely to exist in a view of the executing application. The present technology should not be considered limited by any specific method of determining the navigation objects.

In addition to illustrating attributes of example user interface classes, FIG. 6 also illustrates an example interaction model for navigation objects spawned from the user interface classes. Some example user interface classes include: Application, Window, Alert, Popover, Keyboard, Key, NavigationBar, TabBar, ToolBar, StatusBar, ActionSheet, TableView, TableCell, CollectionView, CollectionCell, Slider, TextField, MapView, PageIndicator, ProgressIndicator, SegmentedControl, ActivityIndicator, Picker, PickerWheel, Butoon, Switch, Icon, Link, Image, Scroll- View, ActivityView, StaticText, SecureTextField, Menu, MenuItem, WebView, Object, etc. An interaction model is a representation of relative weights or probabilities that a given interaction with a related navigation object will result in a predicted transition. For example, a tap interaction of navigation bar 404 is shown to have a probability of 0.25 of resulting in a forward transition, a probability of 0.25 and resulting in a backwards transition, and a probability of 0.25 resulting in a modifying content transition. In other words, a tap is equally likely to result in a forward transition a backward transition or in modified view. A link 420 has a probability of 0.75 resulting in a forward transition, a probability of 0.25 resulting in a backward transition, and a probability of 0.5 of resulting in a modifying content transition. In other words a tap of a link is most likely to yield a forward transition but could also result in a modified content transition, and is least likely to result in a backward transition. Note that in the examples illustrated in FIG. 6, the probabilities do not need to equal one. Each probability can be within a range of 0 to 1.

Navigation object tree service 206 of application testing tool 202 can receive the descriptions of the user interface objects and determine (302) expected transition probabilities for each of the navigation objects in the tree of user interface object descriptions for the first view of the application by obtaining them from the interaction model.

Navigation object tree service 206 can write the tree of user interface object descriptions for the first view, the likely interactions for each identified navigation object, and the probabilities for the likely interactions that each likely interaction will result in a forward navigation to user interface objects stack 214.

Navigation object tree service 206 can sort the tree of user interface object descriptions in the user interface objects stack 214 to order the tree of user interface object descriptions from an interaction with a navigation object that has the greatest transition probability to result in a forward navigation to an interaction with a navigation object that has the least transition probability to result in a forward navigation.

Navigation object tree service 206 can choose (304) the likely interaction having the transition probability with the greatest probability of resulting in a forward navigation. Before applying the interaction to an associated navigation object, navigation object tree service 206 can determine (306) whether the selected interaction for the associated navigation object has already been selected for this view since it would be inefficient and unnecessary to reselect an interaction that has already been applied. If the selected interaction has already been applied on this view (or a similar view) the method can return to step 304 to choose an interaction with the next highest transition probability of resulting in a forward navigation, until an interaction is identified that has not been tried.

When navigation object tree service 206 determines (306) that the selected interaction for the associated navigation object has not already been selected, navigation interaction service 210 can apply (307) the interaction to its associated navigation object. The navigation object can receive the interaction as an input, and the application will then respond as it is programmed to do.

After application (307) of the interaction to the navigation object, view analysis service 204 can compare (310) the tree of user interface object descriptions of the first view with user interface object descriptions of the second view to determine (312) if the second view is a new view, a previous view, or a modified first view. The tree of user interface object descriptions of the second view can be obtained in the same manner as described above with respect to the first view.

View analysis service 204 can determine (312) that the second view (resulting from the applied (307) interaction) is a new view when view analysis service 204 determines that the tree of user interface object descriptions for the second view has not been obtained before. View analysis service 204 can make this determination by comparing the tree of user interface object descriptions for the second view with stored trees of user interface object descriptions for the first view or other previous views stored in user interface objects stack 214 and determining the likelihood that the tree of user interface object descriptions is the same as the tree of user interface object descriptions in user interface objects stack 214.

View analysis service 204 can determine (312) that the second view (resulting from the applied (307) interaction) is the likely the same as a previous view, and thus resulted from a backward navigation, when the tree of user interface object descriptions for the second matches a previously stored tree of user interface object descriptions for a previous view.

View analysis service 204 can determine (312) that the second view (resulting from the applied (307) interaction) is the same as the first view, and thus resulted from modifying the content of the first view when the tree of user interface object descriptions for the second view matches the tree of user interface object descriptions for the first view.

After view analysis service 204 has determined (312) whether the second view resulted from a forward navigation, a backward navigation, or a modification of the first view, view analysis service 204 can adjust (313, 314, 316) the probabilities in the interaction model for the applied (307) interaction.

Figure 7A:
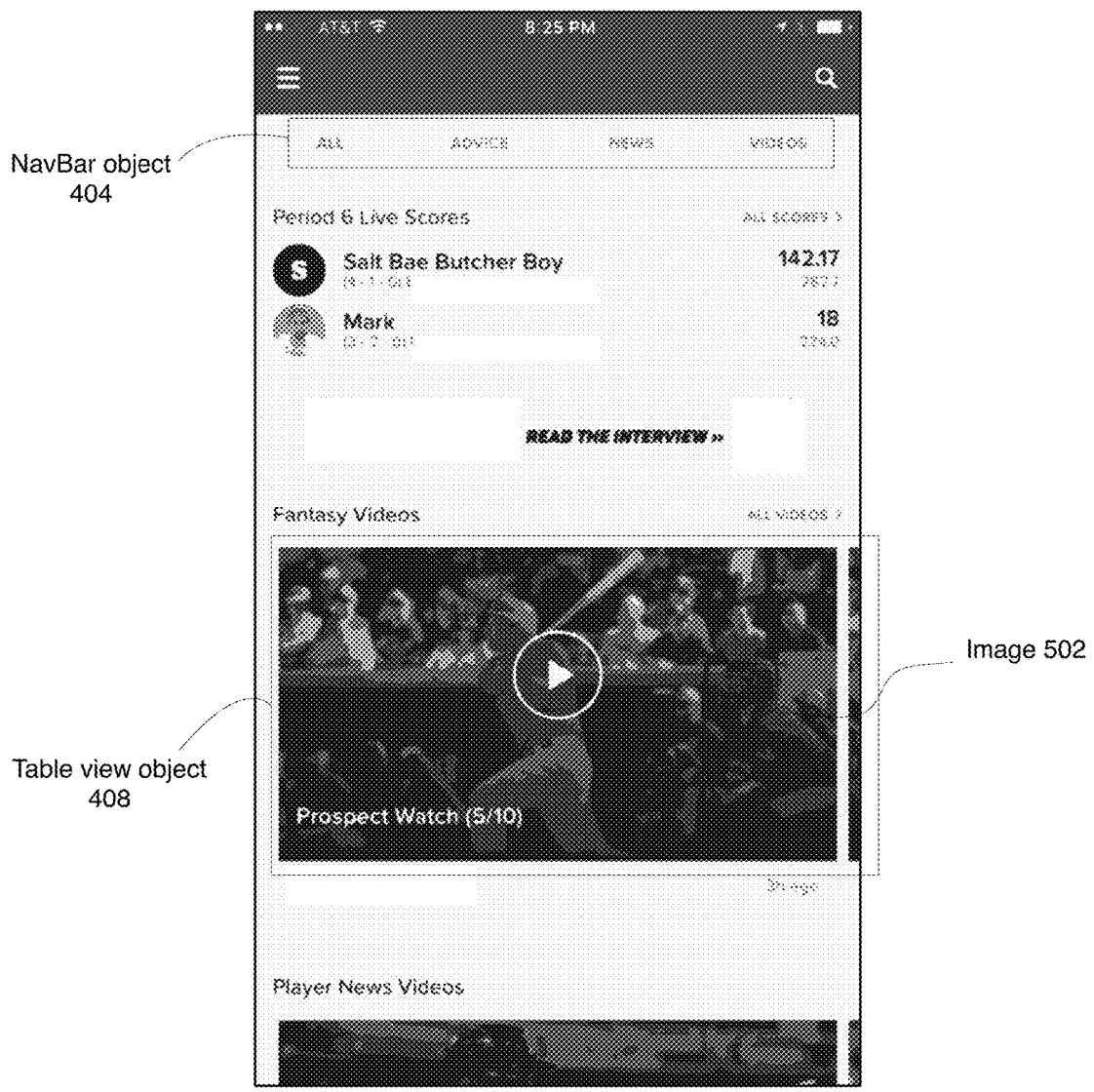
FIGS. 7A, 7B, and 7C shows an example of a view layout of an application in accordance with some embodiments.
Figure 7B:
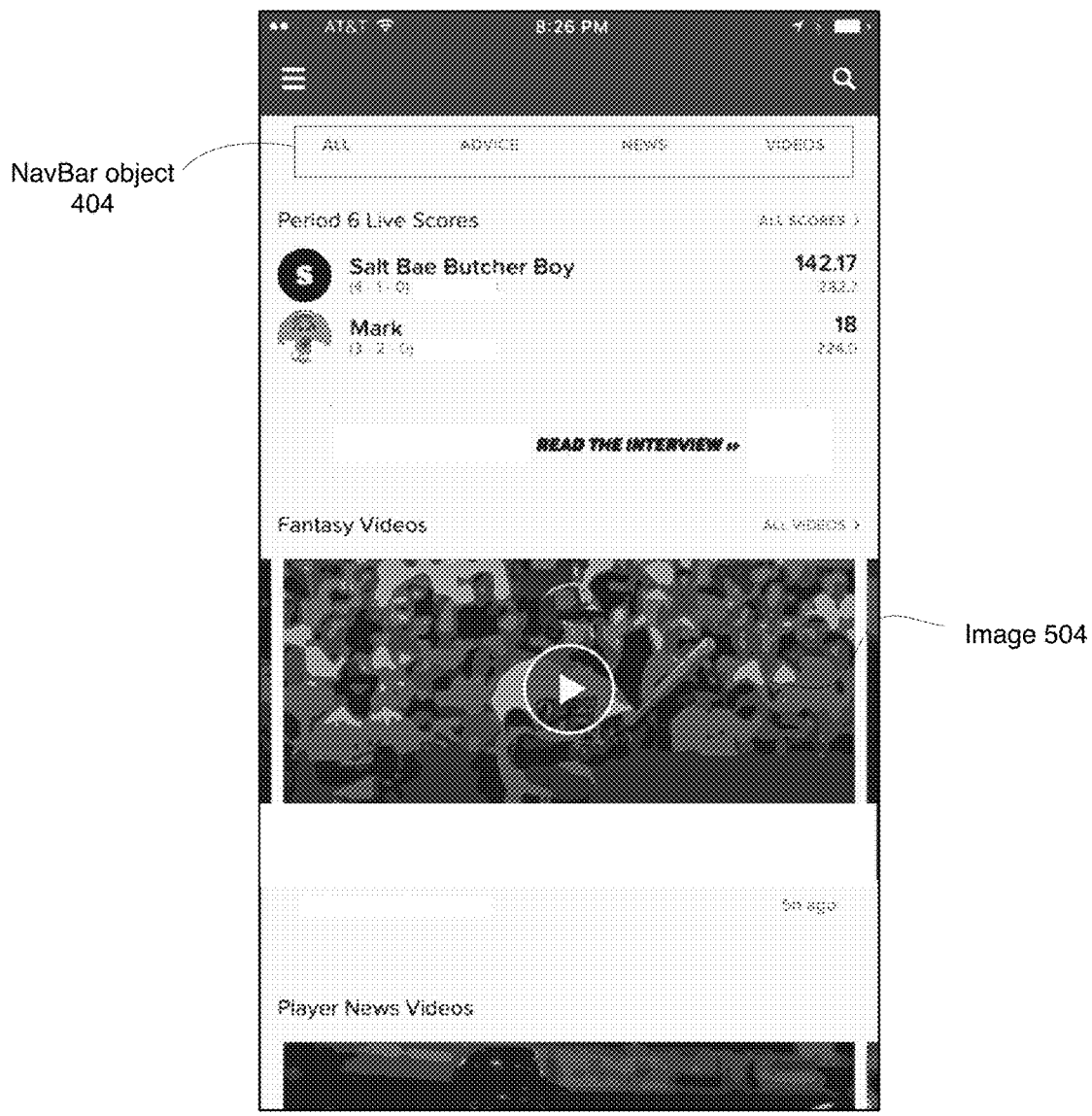

For example, if the interaction were to apply a swipe left interaction to table view object 408 in the screen shown in FIG. 7A, the result may be the screen shown in FIG. 7B. The screen shown in FIG. 7B is the same as the screen shown in FIG. 7A except that image 502 has been replaced with image 504. As such the swipe left interaction when applied to table view object 408 in FIG. 7A resulted in a modification of the screen shown in FIG. 7A, and view analysis service 204 can adjust (313) the interaction model to account for the modification of the first view by decreasing the probability that assigned to a swipe left interaction that the swipe left interaction in a table view will result in a forward navigation, and increasing the probability that a swipe left interaction will result in a content modification.

Figure 7C:
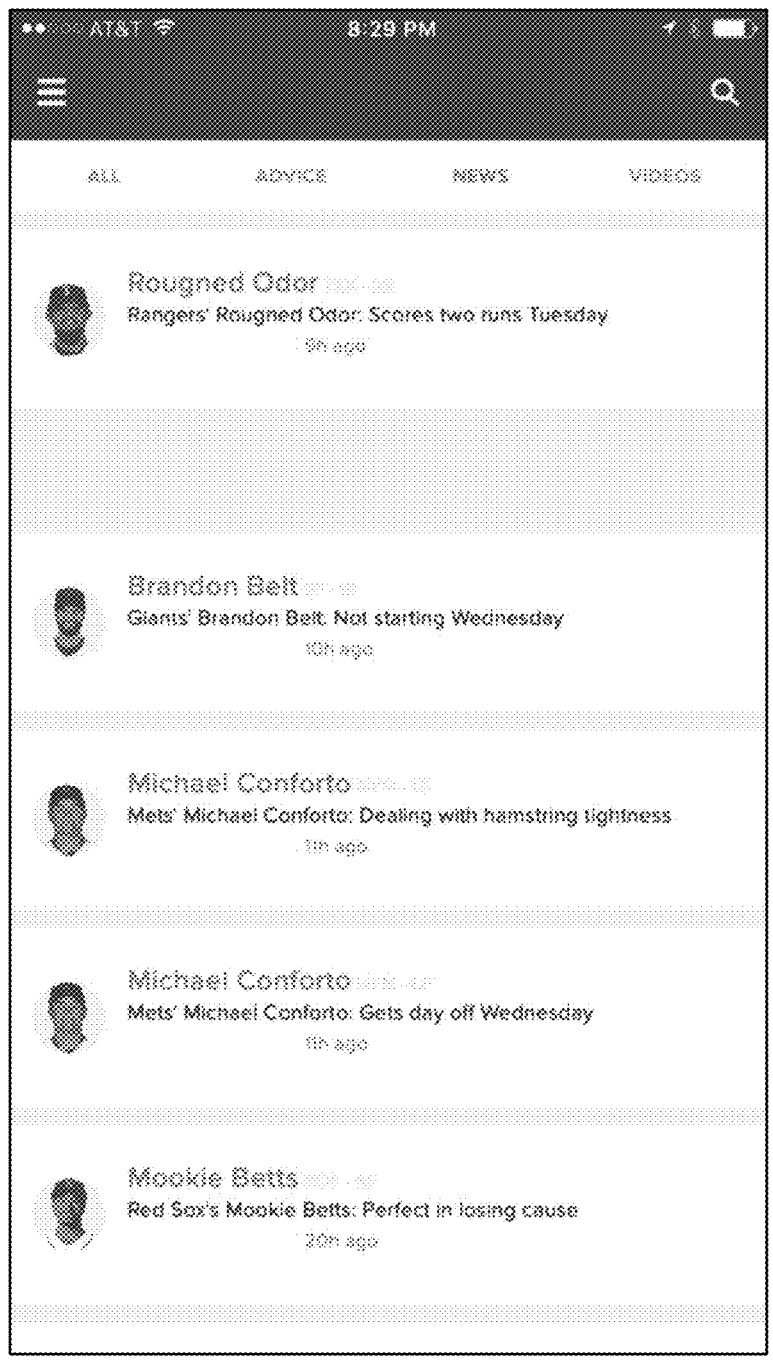

If the interaction were to apply a tap to the "news" button in navigation bar object 404 in the screen shown in FIG. 7A, the result may be the screen shown in FIG. 7C. The screen shown in FIG. 7C is a new screen, as such the tap in the navigation bar object 404 resulted in a forward navigation. View analysis service 204 can adjust (314) the interaction model to account for the forward navigation by increasing the probability assigned to the tap interaction that a tap interaction in a navigation bar will result in a forward navigation.

If the interaction were to apply a tap to the "all" button in navigation bar object 404 in the screen shown in FIG. 7C, the result may be the screen shown in FIG. 7A. The screen shown in FIG. 7A is a previously seen view, as such the tap in the navigation bar object 404 resulted in a backward navigation. View analysis service 204 can adjust (316) the interaction model to account for the backward navigation by increasing the probability assigned to the tap interaction that a tap interaction in a navigation bar will result in a backward navigation.

When the interaction was a backward navigation, or a modification of the first view, the method returns to step 304 in FIG. 3 to choose the next highest interaction beyond the interactions already attempted on the view with a greatest probability of resulting in a forward navigation.

Throughout the execution of the method illustrated in FIG. 3 and FIG. 4 application testing tool 202 can record application execution data in application execution data log 216 during the execution of the application. Application execution data can include calls made by the application to services not provided by application (e.g. resources on the Internet), hardware resource consumption by the application, and crash data, if applicable. Application execution data can be recorded at anytime and/or recorded in response to applying the interaction to the navigation object.

Figure 8:
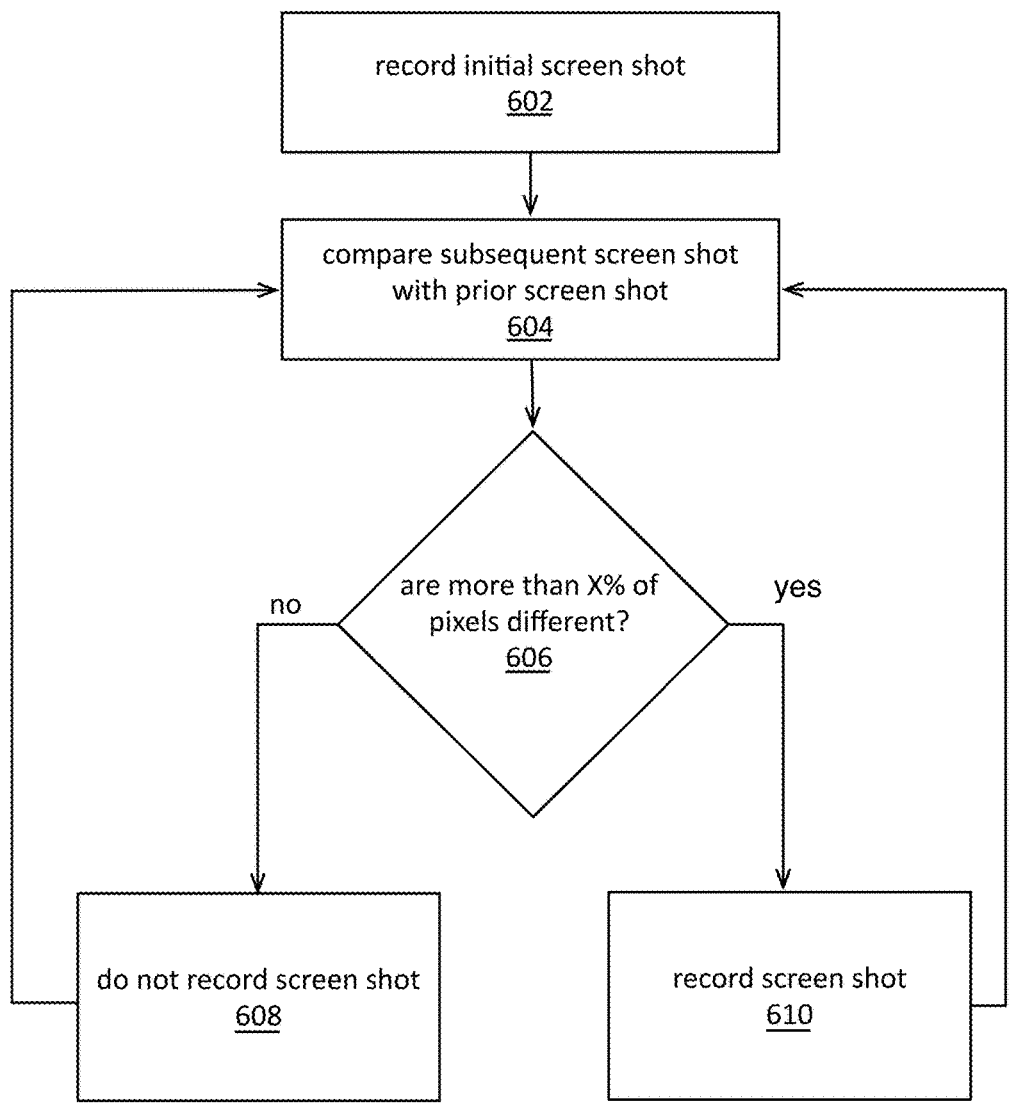
FIG. 8 shows of an example method in accordance with some embodiments.

In addition to recording application execution data, application testing tool 202 can also record screenshots of the application test. An example method of recording screenshots during application testing is shown in FIG. 8. View comparison service 208 of application testing tool 202 can record (602) an initial screenshot. Thereafter application testing tool 202 can take another screenshot of the application, and view comparison service 208 can compare (604) the subsequent screenshot with the prior screenshot. Subsequent screenshots can be taken at the end of an elapsed interval—for example every 30 seconds—or can be taken after an interaction is applied to a navigation object. While multiple screenshots can be taken throughout application testing, application testing 202 might only save screenshots that are significantly different than a prior screenshot. As such view comparison service 208 can determine (606) if more than a threshold number of pixels are different in a subsequent view than the previous view. For example the threshold may be 60% of the pixels. If it is determined (606) by view comparison service 208 that more than a threshold number of pixels are different, then view comparison service 208 can store (610) the screenshot in screenshot log 218. If it is determined (606) by view comparison service 208 that less than a threshold number of pixels are different, view comparison service 208 can discard (608) the screenshot.

The comparison (604) can be a pattern matching or image matching comparison. It is not required that all the pixels being compared are in the same locations between two different views. For example if a view has been scrolled a little bit the views will likely be determined to have less than a threshold number of pixels that are different even though most of the pixels between the views are shifted in location.

After the application test is complete, application testing tool provides user interface service 212 which presents data recorded during the application test. User interface service 212 can present the application execution data from application execution data log 216, and can present recorded screenshots from screenshot log 218. For example FIG. 9 illustrates an example of presented data recorded during application test. As illustrated in FIG. 9 user interface presents network traffic 702 and unique screenshots 704. This report can be reviewed by an app store to determine if the tested application called any Internet resources that are not permitted by app store policies. The report can also be reviewed by application developers.

Figure 10:
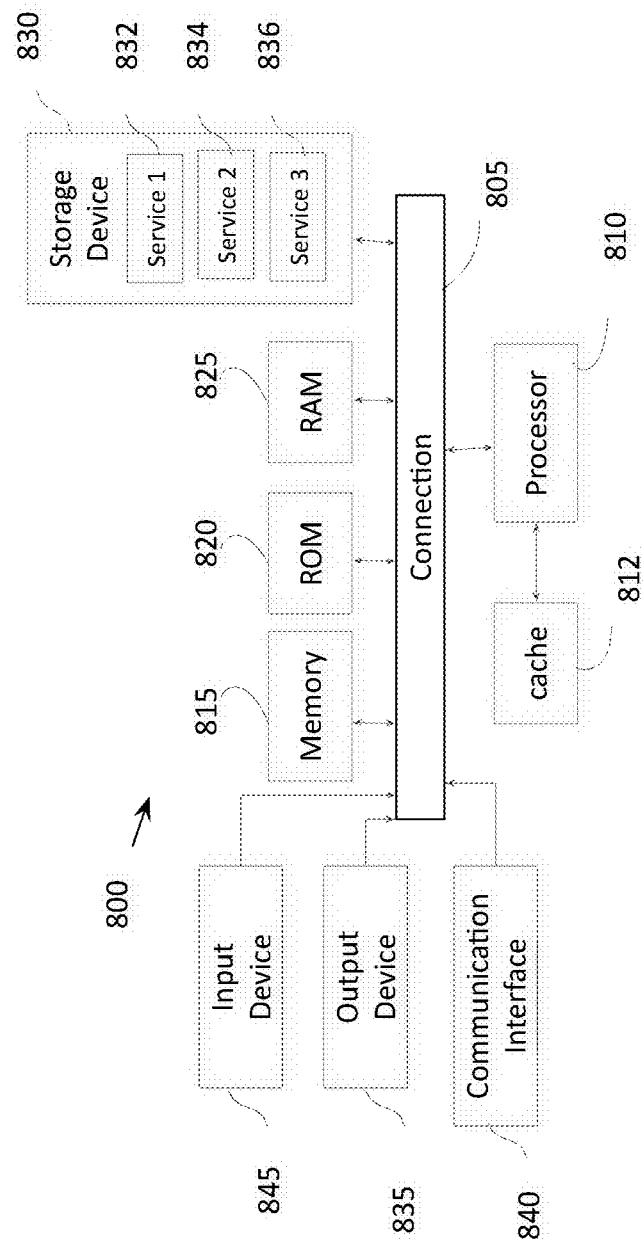
FIG. 10 shows an example of a system for implementing certain aspects of the present technology in accordance with some embodiments.

FIG. 10 shows an example of computing system 800. Computing system 800 can be a computing system which runs application testing tool 202 and the application being tested.

In computing system 800 the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) and random access memory (RAM) to processor 810. Computing system 800 can include a cache of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer readable medium comprising instructions stored thereon, the instructions effective to cause a computing system to:
   initiate execution of an application by an automatic application testing tool;
   obtain a tree of classes of objects in a first view of the application;
   based on the tree of classes of objects in the first view of the application, determine which of the objects in the first view are navigation objects;
   select, by the automatic application testing tool, a particular navigation object from those of the objects in the first view that are navigation objects, the particular navigation object being selected based on respective interaction results associated with the navigation objects;
   apply, by the automatic application testing tool and while the application is running, an interaction to the particular navigation object, the interaction being applied as an input into the particular navigation object, the interaction causing a particular navigation result associated with the particular navigation object; and
   record, by the automatic application testing tool, application execution data obtained during the interaction and while the application is running.

2. The non-transitory computer readable medium of claim 1, wherein obtaining the tree of classes of objects comprises:
   identifying classes pertaining to objects in the first view of the application, the objects being associated with a user interface of the application; and
   determining navigation classes from the classes, the navigation classes having an interactable attribute.

3. The non-transitory computer readable medium of claim 1, comprising instructions effective to cause the computing system to:
   compare, by the automatic application testing tool, pixels of the first view with pixels of a second view of the application, the second view resulting from applying the interaction to the particular navigation object;
   determine, by the automatic application testing tool, a number of pixels that are different between the first view and the second view; and
   when the number of pixels that are different is greater than a threshold number of pixels, determine, by the automatic application testing tool, that the second view is a different view than the first view.

4. The non-transitory computer readable medium of claim 3, comprising instructions effective to cause the computing system to:
   after determining that the second view is a different view than the first view, record, by the automatic application testing tool, a screenshot of the second view.

5. The non-transitory computer readable medium of claim 1, comprising instructions effective to cause the computing system to:
   after application of the interaction to the particular navigation object, compare, by the automatic application testing tool, descriptions of the navigation objects of the first view with descriptions of navigation objects of a second view; and
   when the descriptions of the navigation objects of the first view are different from the descriptions of the navigation objects of the second view, determine, by the automatic application testing tool, that the application of the interaction to the particular navigation object resulted in a forward navigation.

6. The non-transitory computer readable medium of claim 1, wherein obtaining the tree of classes of objects comprises obtaining likely interactions for each navigation object and respective probabilities that each likely interaction will result in a forward navigation, the computer readable medium further comprising instructions to:
write, by the automatic application testing tool, navigation object descriptions for the first view, the likely interactions for each navigation object, and the probabilities for the likely interactions.

7. The non-transitory computer readable medium of claim 6, wherein applying the interaction to the particular navigation object comprises:
identifying, by the automatic application testing tool, the likely interaction having a transition probability comprising a greatest probability to result in a forward navigation; and
applying, by the automatic application testing tool, the likely interaction having the transition probability comprising the greatest probability to result in the forward navigation.

8. The non-transitory computer readable medium of claim 7, comprising instructions effective to cause the computing system to:
after application of the interaction to the particular navigation object, analyze a second view of the application to obtain a second tree of classes of objects in the second view;
compare the tree of classes for the first view with the second tree of classes for the second view;
when the tree of classes for the first view is different than the second tree of classes for the second view, determine that the second view resulted from forward navigation of the application; and
adjust an interaction vector model to account for the forward navigation.

9. The non-transitory computer readable medium of claim 7, comprising instructions effective to cause the computing system to:
after application of the interaction to the particular navigation object, analyze a second view of the application to obtain a second tree of classes of objects in the second view;
compare the tree of classes for the first view with the second tree of classes for the second view;
when the tree of classes for the first view is the same as the second tree of classes for the second view, determine that the second view resulted from a backward navigation of the application; and
adjust an interaction vector model to account for the backward navigation.

10. The non-transitory computer readable medium of claim 7, comprising instructions effective to cause the computing system to:
after application of the interaction to the particular navigation object, analyze a second view of the application to obtain a second tree of classes of objects in the second view;
compare the tree of classes for the first view with the second tree of classes for the second view;
when the tree of classes for the first view is the same as the second tree of classes for the second view, determine that the second view resulted in a backward navigation of the application; and apply the likely interaction having a second transition probability comprising a second greatest probability to result in forward navigation to the second view.

11. The non-transitory computer readable medium of claim 1, wherein the application execution data includes at least one of calls made by the application to services not provided by the application, hardware resource consumption data, and crash data.

12. The non-transitory computer readable medium of claim 11, wherein the application execution data is recorded in response to applying the interaction to the particular navigation object.

13. The non-transitory computer readable medium of claim 1, wherein obtaining the tree of classes includes:
detecting a login screen; and
automatically inputting login credentials into the login screen, the login credentials provided by an application developer along with the application to be tested.

14. A method comprising:
analyzing, by an automatic application testing tool, a first view of an application while the application is executing to determine which of a plurality of objects in the first view of the application are navigation objects;
selecting, by the automatic application testing tool, at least one navigation object from those of the plurality of objects in the first view that are navigation objects, each of the at least one navigation object comprising an object that when an interaction is applied to the object by the automatic application testing tool, causes the application to provide a second view of the application, the at least one navigation object being selected based on respective interaction results associated with the navigation objects;
automatically navigating, by the automatic application testing tool while the application is executing, one or more views of the application by automatically providing a respective input into each of the at least one navigation object; and
while automatically navigating the one or more views of the application, recording application execution data.

15. The application testing method of claim 14 wherein the application execution data includes at least one of calls made by the application to services not provided by the application, hardware resource consumption, and crash data.

16. The application testing method of claim 15 comprising:
while automatically navigating the one or more views of the application, recording a screenshot of the views of the application.

17. A system comprising:
one or more processors; and
at least one computer-readable storage medium having stored therein instructions which, when executed by the one or more processors, cause the system to:
analyze a first view of an application running on the system to determine which of a plurality of objects in the first view of the application are navigation objects;
select a navigation object from those of the plurality of objects in the first view that are navigation objects, the selected navigation object comprising an object that when an interaction is applied to the object, results in a display of a second view of the application, the selected navigation object being selected based on respective interaction results associated with the navigation objects;

apply the interaction to the selected navigation object from the navigation objects; and record application execution data during execution of the application and the interaction.

18. The system of claim 17, the at least one computer-readable storage medium storing instructions which, when executed by the one or more processors, cause the system to:

construct a tree of navigation objects in the first view, the tree of navigation objects comprising an identification of each navigation object, likely interactions for each navigation object, and an expected transition probability for each likely interaction in the tree of navigation objects, wherein the expected transition probability for each navigation object is determined from an interaction vector model having weights for each likely interaction; and record the tree of navigation objects for the first view.

19. The system of claim 17, the at least one computer-readable storage medium storing instructions which, when executed by the one or more processors, cause the system to apply an interaction to the selected navigation object from the navigation objects when the selected navigation object has a greatest transition probability of resulting in a forward navigation of the application.

20. The system of claim 19, the at least one computer-readable storage medium storing instructions which, when executed by the one or more processors, cause the system to:

after the application of the interaction to the selected navigation object, analyze a second view resulting from the application of the interaction to obtain a first respective tree of navigation objects for the second view;

compare a second respective tree of navigation objects for the first view with the first respective tree of navigation objects for the second view;

when the second respective tree of navigation objects for the first view is different than the first respective tree of navigation objects for the second view, determine that the second view resulted in a forward navigation of application to the second view; and adjust an interaction vector model to account for the forward navigation.

21. The system of claim 17, the at least one computer-readable storage medium storing instructions which, when executed by the one or more processors, cause the system to:

compare pixels of the first view with pixels of the second view;

when a first number of pixels of the second view that is different than a second number of pixels on the first view is greater than a threshold number of pixels, determine the second view to be a different view than the first view; and after the determination that the second view is a different view than the first view, record a view image of the second view in a screen shot log.

22. The system of claim 17, the at least one computer-readable storage medium storing instructions which, when executed by the one or more processors, cause the system to:

present, on a user interface, automatic testing results associated with automatic testing of the application, the automatic testing results comprising the application execution data.

* * * * *